United States Patent [19]

Remesy et al.

[11] Patent Number: 4,652,454
[45] Date of Patent: Mar. 24, 1987

[54] REHYDRATING COMPOSITION WHICH CAN BE USED ESPECIALLY IN THE FEEDING OF YOUNG ANIMALS WHICH CAN NO LONGER DIGEST MILK NORMALLY, AND A COMPLEMENT FOR ITS PREPARATION

[75] Inventors: Christian Remesy, Clermont-Ferrand; Christian Demigne, Beaumont, both of France

[73] Assignee: Institut National de la Recherche Agronomique (INRA), Paris, France

[21] Appl. No.: 570,002

[22] Filed: Jan. 11, 1984

[30] Foreign Application Priority Data

Jan. 12, 1983 [FR] France .................................. 83 00390

[51] Int. Cl.$^4$ ............................................. A12K 1/175
[52] U.S. Cl. ..................... 426/74; 426/583; 426/807
[58] Field of Search ..................... 426/2, 74, 630, 635, 426/807, 583; 424/153, 154, 95

[56] References Cited

U.S. PATENT DOCUMENTS

| | | |
|---|---|---|
| 2,302,511 | 11/1942 | Wallach .............................. 426/2 X |
| 3,241,974 | 3/1966 | Seiden ................................ 426/2 |
| 3,821,368 | 6/1974 | Reynolds ........................... 424/153 |
| 3,898,328 | 8/1975 | Beigler et al. .................. 424/154 X |
| 3,928,574 | 12/1975 | Phillips ............................ 424/153 |
| 3,978,212 | 8/1976 | Barna ................................ 424/154 |
| 4,202,887 | 5/1980 | Talbot et al. ....................... 424/154 |
| 4,320,150 | 3/1982 | Austin et al. .................... 426/807 X |
| 4,419,369 | 12/1983 | Nichols et al. ......................... 426/2 |
| 4,448,770 | 5/1984 | Epting .................................. 424/153 |
| 4,454,162 | 6/1984 | Schanze ......................... 426/807 X |

Primary Examiner—R. B. Penland
Attorney, Agent, or Firm—Blakely, Sokoloff, Taylor & Zafman

[57] ABSTRACT

The present invention relates to a rehydrating composition and a complement for its preparation.

The rehydrating composition comprises:

lactose or a lactose-based product; and a complement containing chloride, acetate and or propionate anions and sodium, potassium and/or magnesium cations.

The composition is applied especially to the feeding of young ruminants and piglets which can no longer digest milk normally.

12 Claims, No Drawings

REHYDRATING COMPOSITION WHICH CAN BE USED ESPECIALLY IN THE FEEDING OF YOUNG ANIMALS WHICH CAN NO LONGER DIGEST MILK NORMALLY, AND A COMPLEMENT FOR ITS PREPARATION

FIELD OF THE INVENTION

The present invention relates to a rehydrating nutrient composition which can be used especially in the feeding of young animals, in particular young ruminants and piglets, which can no longer digest milk normally. It also relates to a complement for the preparation of such a composition. The rehydrating action (stimulation of the absorption of water and sodium by various compounds) can be exerted by numerous compositions including, as the borderline case, milk (although this is relatively poor in sodium). Synthetic rehydrating agents are simplified compositions in which the maximum rehydrating effect is sought at the expense of the energy value. Between the two extremes—synthetic rehydrating agents and various forms of milk—there can be novel compositions having a rehydrating effect and also a nutrient effect by providing nutriments readily digestible by animals which can no longer digest milk properly.

PRIOR ART

It is well known that it can be necessary to discontinue, or at least greatly reduce, milk feeding in young animals, especially young ruminants or piglets, during various digestive disturbances, whether these are due to diarrhea or various stress conditions.

In calves, for example, it is necessary to discontinue, or at least greatly reduce, milk feeding during postnatal diarrhea, whether this diarrhea is of bacterial or viral origin. In the case of the chalky diarrhea which appears in older calves, it is obvious that the calf is no longer capable of properly digesting the milk which it usually receives; this condition manifests itself by the passage of feces of abnormal consistency and also by steatorrhea. As regards the stresses associated with transportation and regrouping, the digestion of milk can be affected by disturbances of the emptying of the abomasum.

The administration of milk to animals suffering from digestive disorders such as diarrhea, and during dehydration, presents several problems:

(a) In the event of disturbances of the emptying of the abomasum, the administration of milk tends to worsen the situation and can lead to virtually total blockage, which jeopardizes any subsequent treatment by oral administration.

(b) Even if the processes for formation of the coagulum are taking place virtually normally, the duration of the subsequent hydrolysis process results in restricting the quantities of liquid ingested and the rate of rehydration. In the event of diarrhea, the quantities of water and minerals consumed can be substantially less than the losses in the intestine.

(c) In the event of severe diarrhea, there is a risk of disturbances of the degradation, in the intestinal lumen, of the more complex molecules such as proteins and lipids.

(d) The metabolic state of dehydrated animals (anoxia, acidosis, hyperuremia and high glucocorticoids) is not very favorable to rapid utilization of large quantities of aminoacids and lipids by the organism.

(e) The mineral composition of milk favors an active anabolism because of its richness in phosphorus, calcium and potassium. Although the richness in potassium is a favorable factor in the event of dehydration with losses of intracellular cations, the poorness of milk in sodium and chloride, which are lost in very large quantities during diarrhea, makes this food very unsuitable for the needs of animals in a state of dehydration. In fact, it must be pointed out that the absorption of sodium very greatly stimulates the absorption of water.

Together, the various factors listed above have the effect that animals in a state of dehydration exhibit a more or less pronounced intolerance to milk. In fact, these animals are at one and the same time in a state of dehydration, in a state of mineral deficiency, especially a deficiency of $Na^+$, $K^+$ and $Cl^-$, and in a state of energy deficiency.

Various formulations for oral administration, or rehydrating agents, have already been proposed for correcting the dehydration disorders and the mineral losses as a priority. However, the energy provision of these formulations is extremely limited. In fact, this provision is generally made in the form of glucose and organic acids, together with a few aminoacids such as glycine, which moreover has the disadvantage of being poorly utilized in animals suffering from energy deficiency.

The major disadvantage of these rehydrating agents is that the energy provision is limited by problems of osmotic pressure, because of the regard for isotonicity. In addition, with high glucose concentrations in the lumen, a large part of the glucose absorption takes place by diffusion processes which are independent of co-transportation with the sodium.

The use of lactose has rarely been recommended for the feeding of animals suffering from diarrhea, because of the widely held opinion that lactase, situated near the surface of the enterocytes, disappears during diarrhea.

SUMMARY OF THE INVENTION

The Applicant Company has now found that, contrary to all expectations, lactose can be used in the preparation of suitably complemented rehydrating compositions for the feeding of young animals which may have problems of milk digestion. The rehydrating compositions of the invention comprise:

lactose or a lactose-based product; and a complement containing chloride, acetate and/or propionate anions and sodium, potassium and/or magnesium cations.

The use of lactose as a principal component in the rehydrating compositions of the invention has numerous advantages compared with the use of glucose. The main advantages to be pointed out are: half of the osmotic pressure for an equal weight, hydrolysis at a site very close to the co-transportation system $Na^+$-glucose or $Na^+$-galactose, a more balanced carbohydrate provision (glucose+galactose) and a possible Maillard's reaction which is greatly reduced compared with the reaction with glucose. It must also be noted that the carbohydrate fraction (lactose) is hydrolysed by the lactose immediately on coming into contact with the intestinal cells.

It is preferable, particularly for economic reasons, to use the lactose in the form of whey. Apart from these economic reasons, it must be noted that whey is very advantageous since it is in fact devoid of the nutriments whose digestion can present problems, namely casein and lipids. Furthermore, whey contains moderate quantities of proteins, especially lactoglobulins, which can have a favorable effect.

It is very especially advantageous to use mild whey, that is to say whey obtained after the action of rennet; this mold whey ensures a mineral provision very similar to that of milk, except for being poor in calcium and phosphorus. Salt mild whey used in the fabrication of some cheeses must be however avoided.

It is also possible to use acid whey, that is to say whey obtained by treating the milk with lactic acid.

In such a case lactic acid must be partially neutralised with sodium hydroxide to a pH of about 6.

The complement used in the compositions of the invention is intended to restore the balance of this whey, in particular by means of sodium salts (acetate, propionate and chloride).

Organic anions, such as propionate and acetate, are advantageous in several respects:

They can favor emptying the abomasum.

Propionate, in particular, possesses a bacteriostatic action in relatively concentrated solutions and, at average doses (30 mM), a favorable effect on the digesitve flora by increasing the ratio of lactobacilli colibacilli.

These organic anions can increase the absorption of sodium, and hence that of water, at all points in the digestive tract. In fact, these anions are absorbed in the proximal small intestine, in the distal small intestine (ileum) and in the large intestine, whereas the chloride ion is absorbed essentially in the distal small intestine. Furthermore, the place where they are normally produced and absorbed is the large intestine. Consequently, this results in a greater degree of safety in the rehydration.

The metabolism of acetate and propionate is rapid and makes it possible to combat metabolic acidosis. In fact, acetate is metabolized to $CO_2$; sodium bicarbonate, which constitutes a physiological buffer substance for the blood, is therefore formed from sodium acetate. As propionate is glucogenic, the glucose produced is then metabolized especially for $CO_2$, and the same effects are therefore found as in the case of acetate.

It is also possible to prepare the rehydrating compositions of the invention using lactose instead of whey. In this case, it is possible to obtain feeds having a formulation similar to that of a complemented whey by preparing a complement (anions and cations) resulting in a formulation similar to that of a complemented whey, except for the nitrogenous and lipid fraction which remains in this product.

The complement must then contain, in addition to the cations and anions envisaged in the case of whey, phosphate (0 to 10 mmoles/l), calcium and possibly the majority of the electrolytes present in very small quantities in whey.

The lactose-based product may further consist of lactose or whey hydrolysed by lactase.

The compositions of the invention can also contain other additives.

Thus, it is possible to add a salt of a $C_4$ to $C_8$ carboxylic acids, in particular an octanoate, which is useful as a preservative because of its bacteriostatic properties.

It is also possible to improve the local immunoprotection against pathogenic agents by adding lactoglobulins, obtained by filtration of whey, to the compositions of the invention at a rate of, for example, about 5 g/liter.

Furthermore, it is possible to increase the energy concentration of the compositions of the invention by adding triglycerides of short-chain or medium-chain fatty acids at a rate of, for example, about 15 g/liter; likewise, as regards calves subjected to regrouping stresses, it is possible to replace some of the whey (at most ⅓) with skim milk powder or to add this product as an extra (10 to 30 g/liter).

It is also possible to add a hexose, such as glucose, galactose or sorbitol, to the lactose-based or whey-based compositions in an amount of 10 to 20 g/liter.

The preparation of rehydrating compositions from lactose instead of whey is certainly more expensive and also foregoes the advantage of the provision of certain vitamins and trace elements contained in whey. On the other hand, the lactose-based compositions, especially in the case where glucose is added, have the advantage of reducing as far as possible the risk of Maillard's reaction between carbohydrates and aminoacids.

Whey-based compositions can be prepared from dehydrated whey (mild or acid), non-concentrated whey or concentrated whey.

The compositions will preferably comprise between 20 and 50 g/liter of dehydrated mild whey or an equivalent quantity of non-concentrated or concentrated whey, provided that the latter have the same technological properties as dehydrated whey.

The whey-based compositions will advantageously be prepared in solution and then dried by means of a suitable apparatus, for example by means of a drying tower, so as to give a dry product which can be packaged in sachets. The solution can be prepared by dissolving the various additives in the liquid whey or by dissolving the various additives and the dehydrated whey in water. If the composition is to contain triglycerides, these will be added before drying.

In the case where the compositions are prepared from lactose, this will preferably be present in a proportion of 15 to 50 g/liter, together, as indicated above, with a complement making it possible to achieve the electrolyte composition of the complemented whey, at least as regards the macroelements and the principal anions.

The lactose-based compositions will be prepared directly in the dry form, preferably using dehydrated salts, and then packaged in sachets.

As indicated previously, the compositions of the invention can also contain a hexose. The presence of a hexose is very particularly desirable when the proportions of whey in the compositions are less than 35 g/liter and when the proportions of lactose in the compositions are less than 25 g/liter.

The compositions defined in this way will provide the following, per liter of liquid composition:

| | |
|---|---|
| sodium | 30 to 100 mmol/liter |
| potassium | 5 to 40 mmol/liter |
| chloride | 20 to 60 mmol/liter |
| acetate | 0 to 50 mmol/liter |
| propionate | 0 to 50 mmol/liter |
| magnesium | 1 to 5 mmol/liter |
| glucose | 0 to 100 mmol/liter |
| galactose | 0 to 100 mmol/liter |
| sorbitol | 0 to 100 mmol/liter |
| calcium | 5 to 15 mmol/liter |
| phosphate | 5 to 15 mmol/liter |

The rehydrating nutrient compositions thus obtained are intended for the feeding of young animals, in particular young ruminants of piglets, which can have problems of milk digestion following attacks of diarrhea of various stresses. These compositions can be administered orally and can be presented in the form of compositions for drinking, sucking or introduction via a catheter. The rehydrating compositions of the invention can thus be used in various situations; amongst these, there should be mentioned, in particular, diarrhea with dehydration, chalky diarrhea and stress situations.

As regards diarrhea with dehydration, the compositions can be used in the following cases:

(a) slight dehydration (less than 5%) or incipient dehydration: in this case, it is necessary to discontinue milk feeding and a use a rehydrating composition according to the invention (for example transition to complemented whey); and (b) severe dehydration: it is necessary either initially to administer known rehydrating agents intravenously and then to feed with a composition according to the invention, or to use entirely synthetic rehydrating agents consisting of glucose, aminoacids and organic acids.

It must be noted that the solutions administered intravenously are generally very deficient in potassium; it is therefore essential, as soon as the animal is capable of eating again, to administer a liquid feed rich in potassium.

In the case of chalky diarrhea, this is commonly accompanied by steatorrhea when the dehydration is not very pronounced. The use of a whey-based composition according to the invention is particularly suitable because of its very good tolerance and its low lipid content.

As regards the stress situations (transportation and regrouping), the use of a composition according to the invention is particularly suitable. In fact, the composition used is a very assimilable liquid feed whose digestion is largely unaffected by any dysfunction of the abomasum or of the biliary or pancreatic secretion.

It must also be emphasized that the compositions of the invention favor the transition to a milk diet, whereas the synthetic rehydrating agents, which do not contain lactose, can make the transition to milk critical.

Two examples of compositions according to the invention will now be given solely by way of indication, one being intended for a feed relatively poor in whey (30 g/liter) and the other for a feed rich in whey (50 g/liter).

| Complement | Feed containing 30 g/liter of whey | Feed containing 50 g/liter of whey |
|---|---|---|
| NaCl | 25 mM | 15 mM |
| KCl | 8 mM | 6 mM |
| MgCl$_2$ | 1 mM | 1 mM |
| NaCH$_3$COO | 30 mM | 0 mM |
| NaCH$_3$CH$_2$COO | 10 mM | 30 mM |
| total composition: (mmol/liter) | | |

| | Feed poor in whey (30 g/liter) | | Feed rich in whey (50 g/liter) | |
|---|---|---|---|---|
| | provision from whey | total | provision from whey | total |
| Na | 10.5 mM | 75.5 mM | 17.5 mM | 62.5 mM |
| K | 19.5 mM | 27.5 mM | 24 mM | 30 mM |
| Ca | 4.5 mM | 4.5 mM | 7.5 mM | 7.5 mM |
| Mg | 0.3 mM | 1.3 mM | 0.5 mM | 1.5 mM |
| PO$_4$ | 5.5 mM | 12 mM | 8.2 mM | 15 mM |
| Cl | 16.5 mM | 51.5 mM | 20.5 mM | 44 mM |
| VFA* | <1 mM | 40 mM | <2 mM | 30 mM |

*VFA denotes the volatile fatty acids (acetate and propionate).

Preliminary tests were carried out with animals using the two examples of compositions indicated above.

The feed poor in whey was fed to calves which were a few days old and suffering from infectious diarrhea, whereas the feed in rich in whey was fed to calves suffering from chalky diarrhea. The results were as follows:

(a) calves suffering from liquid diarrhea: 22 cures 22 cases, need for intravenous perfusion in one case (doses fed orally: 3 times 1.5 liters per day).

(b) calves suffering from very liquid diarrhea: 15 cures/18 cases, recourse to intravenous perfusion in 7 cases.

It must also be noted that the practitioners who tested the compositions often administered antibiotics, in particular colistin.

calves suffering from chalky diarrhea: 46 cures 50 cases, 19 of which were very severely affected (dose offered: 2 liters 2 to 3 times per day).

It is therefore apparent that the compositions of the invention can be used successfully in cases of infectious diarrhea, where the results are similar to those obtained with a rehydrating agent administered orally, and in the case of chalky diarrhea, where the results show significant progress compared with the results obtained hitherto.

As regards the use of the present compositions in calves subjected to transportation or regrouping stresses, it is desirable to feed the animals with at least 3 liters per day of a composition containing moderate quantities of whey (proportion of the order of 30 g liter). As regards prevention of the disorders accompanying regrouping stress, the quantities to be fed are 2 times about 3 liters per day of a higher energy formulation, that is to say a formulation richer in whey (proportion of the order of 50 g/liter).

In piglets, two types of diarrhea can be encountered: infectious diarrhea shortly after birth, and weaning diarrhea in the older animals.

As regards the postnatal infectious diarrhea, it is possible to rehydrate the animals by means of solutions administered intraperitoneally or subcutaneously, or to treat the animals orally or by gastric intubation with the products of the present invention.

As regards the weaning diarrhea, there are again several possibilities. It is possible to replace some of the available drinking water with the composition of the present invention, or to feed the animals with granules comprising from 30 to 50% of the compositions of the present invention, mixed with corn meal, cakes (essentially soybean cakes) and cereal by-products (brans).

What is claimed is:

1. A rehydrating composition useful for the treatment of young ruminants and piglets which can no longer digest milk normally and are subject to diarrhea therefore, consisting essentially of:
   30 to 100 mmol/liter of sodium;
   5 to 40 mmol/liter of potassium;
   20 to 60 mmol/liter of chloride;
   0 to 50 mmol/liter of acetate;
   0 to 50 mmol/liter of propionate;
   1 to 5 mmol/liter of magnesium; and
   20 to 50 grams/liter whey selected from the group consisting of mild whey, acid whey and whey hydrolyzed by lactase.

2. The composition as claimed in claim 1, wherein said whey is selected from the group consisting of dehydrated mild whey and non-concentrated whey.

3. The composition as claimed in claim 2 further comprising 10 to 20 g/liter of a hexose selected from the group consisting of glucose, galactose and sorbitol, when the concentration of said whey in said composition is less than 35 g/liter.

4. The composition as claimed in claim 1, wherein said whey is selected from the group consisting of dehydrated mild whey and concentrated whey.

5. The composition as claimed in claim 4 further comprising 10 to 20 g/liter of a hexose selected from the group consisting of glucose, galactose and sorbitol, when the concentration of said whey in said composition is less than 35 g/liter.

6. The composition as claimed in claim 1, wherein said composition is dehydrated.

7. The composition as claimed in claim 1 further comprising lactose, 0–10 mmol/l phosphate, calcium and trace quantities of electrolytes present in whey.

8. The composition as claimed in claim 7, wherein said lactose comprises 15 to 50 g/liter lactose.

9. The composition as claimed in claim 8, further comprising 10 to 20 g/liter of a hexose selected from the group consisting of glucose, galactose and sorbitol when the concentration of lactose in said composition is less than 25 g/liter.

10. The composition as claimed in claim 1 further comprising an additive selected from the group consisting of:
- a salt of a $C_4$ to $C_8$ carboxylic acid;
- lactoglobulins;
- 10 to 30 grams per liter of skim milk powder; and
- a mixture of triglycerides of short-chain and medium-chain fatty acids.

11. The composition as claimed in claim 10, wherein said carboxylic acid salt is an octanoate.

12. The composition as claimed in claim 1 adapted to be administered orally.

* * * * *

UNITED STATES PATENT AND TRADEMARK OFFICE
CERTIFICATE OF CORRECTION

PATENT NO. : 4,652,454
DATED : March 24, 1987
INVENTOR(S) : Remesy et al.

It is certified that error appears in the above-identified patent and that said Letters Patent is hereby corrected as shown below:

| COLUMN | LINE | |
|---|---|---|
| 3 | 5 | Please delete "mold" and insert --mild--. |
| 5 | 10 | Please delete "a", first reference. |

Signed and Sealed this

First Day of December, 1987

Attest:

DONALD J. QUIGG

Attesting Officer

Commissioner of Patents and Trademarks